(12) United States Patent
Jaurand et al.

(10) Patent No.: US 8,979,029 B2
(45) Date of Patent: *Mar. 17, 2015

(54) SYSTEM FOR CARRYING AND DROPPING LOADS FOR A TRANSPORT AIRPLANE

(75) Inventors: Benoît Jaurand, Vanves (FR); Frédéric Michaud, Paris (FR)

(73) Assignee: MBDA France, Paris (FR)

( * ) Notice: Subject to any disclaimer, the term of this patent is extended or adjusted under 35 U.S.C. 154(b) by 192 days.

This patent is subject to a terminal disclaimer.

(21) Appl. No.: 13/515,760

(22) PCT Filed: Dec. 13, 2010

(86) PCT No.: PCT/FR2010/000833
§ 371 (c)(1),
(2), (4) Date: Jun. 13, 2012

(87) PCT Pub. No.: WO2011/080410
PCT Pub. Date: Jul. 7, 2011

(65) Prior Publication Data
US 2012/0251280 A1    Oct. 4, 2012

(30) Foreign Application Priority Data

Dec. 16, 2009 (FR) ...................................... 09 06104

(51) Int. Cl.
*B64C 1/22* (2006.01)
*B64D 1/10* (2006.01)
*B64D 1/12* (2006.01)

(52) U.S. Cl.
CPC ... *B64D 1/10* (2013.01); *B64D 1/12* (2013.01)
USPC ...................... 244/137.1; 244/136; 244/118.1; 89/1.59; 89/1.51

(58) Field of Classification Search
CPC .............. B64C 1/22; B64D 1/06; B64D 7/00; B64D 1/02; B64D 1/04; B64D 9/00
USPC .................. 244/137.1, 137.3, 136, 118.1, 63; 89/1.51, 1.59

See application file for complete search history.

(56) References Cited

U.S. PATENT DOCUMENTS 3,371,891 A * 3/1968 Brader, Sr. et al. ........ 244/137.3
3,511,457 A * 5/1970 Pogue ........................ 244/137.3

(Continued)

FOREIGN PATENT DOCUMENTS

| DE | 103 13 279 A1 | 10/2004 |
| DE | 103 42 565 A1 | 4/2005 |
| GB | 1 074 825 A | 7/1967 |

OTHER PUBLICATIONS

International Search Report completed Apr. 8, 2011 and mailed Apr. 20, 2011 from corresponding International Application No. PCT/FR2010/000833 filed Dec. 13, 2010 (2 pages).

(Continued)

*Primary Examiner* — Valentina Xavier
*Assistant Examiner* — Alexander V Giczy
(74) *Attorney, Agent, or Firm* — Klein, O'Neill & Singh, LLP

(57) ABSTRACT

The present disclosure relates to a system for carrying and dropping ammunition for a transport airplane. The system includes a container which contains at least one load, in particular ammunition, which is capable of being brought into a drop position, in which a portion is located outside the airplane, and from which a load can be dropped, usually by simply releasing the load.

19 Claims, 4 Drawing Sheets

(56) References Cited

U.S. PATENT DOCUMENTS

| | | | |
|---|---|---|---|
| 4,161,301 A | * | 7/1979 | Beardsley et al. ......... 244/137.3 |
| 4,208,949 A | * | 6/1980 | Boilsen ........................ 89/1.801 |
| 4,256,012 A | | 3/1981 | Cowart et al. |
| 4,681,013 A | * | 7/1987 | Farley et al. ................. 89/1.815 |
| 5,763,811 A | | 6/1998 | Ruzicka |
| 2005/0116110 A1 | * | 6/2005 | Mitzmacher ............... 244/137.4 |

OTHER PUBLICATIONS

Written Opinion from corresponding International Application No. PCT/FR2010/000833 filed Dec. 13, 2010 (11 pages).

* cited by examiner

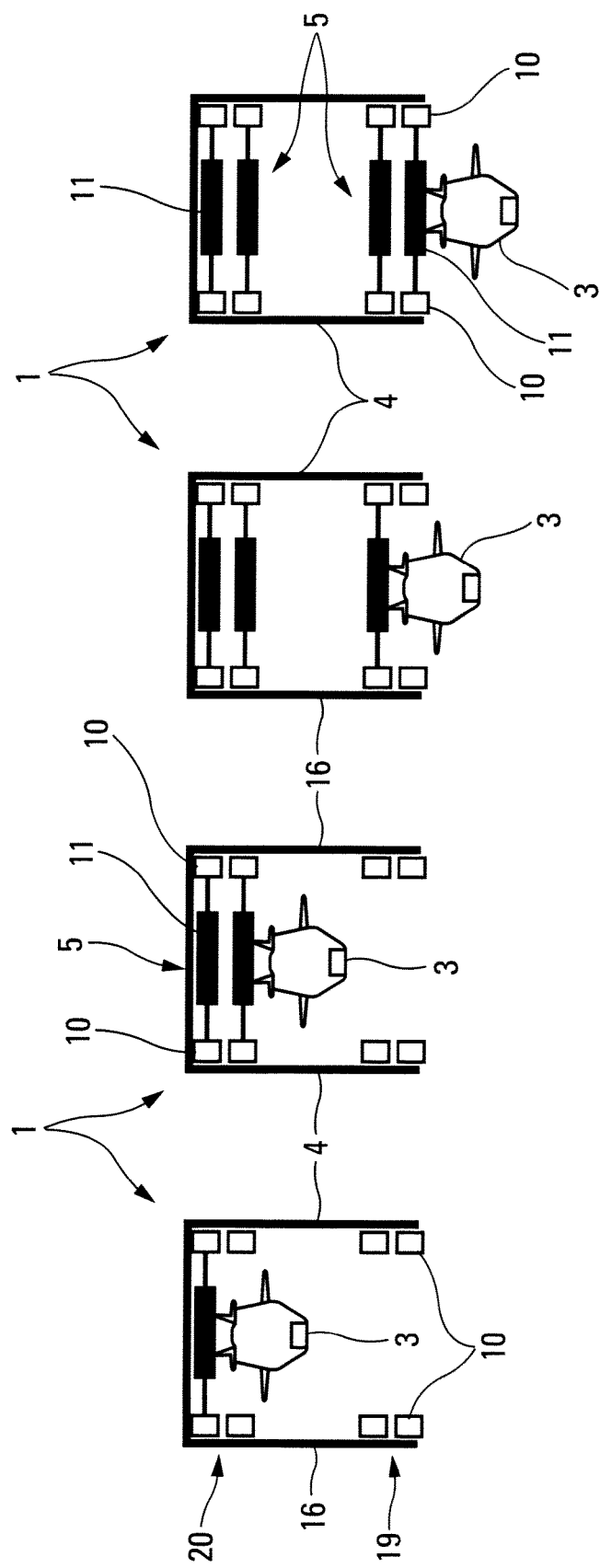

SYSTEM FOR CARRYING AND DROPPING LOADS FOR A TRANSPORT AIRPLANE

CROSS-REFERENCE TO RELATED APPLICATIONS

This is a national phase application under 35 U.S.C. §371 of PCT Application No. PCT/FR2010/000833 filed Dec. 13, 2010, which claims the benefit of French application No. 0906104 filed Dec. 16, 2009, the contents of each of which are expressly incorporated herein by reference.

FIELD OF ART

The present disclosure relates to a load carrying and dropping system for a transport plane.

BACKGROUND

Within the field of the present method, system and device, the term load means any object able to be carried and dropped from a plane. These could be particularly drones, freight, etc. Preferably, a load corresponds to a piece of ammunition which, within the framework of the present method, system and device, means a missile or bomb type projectile. Preferably, such projectile is part of a usual weapon system with a military load and is provided with a propelling system and guiding means adapted to fly it and guide it toward a target to be damaged or destroyed. This can be particularly a guided bomb or a cruising missile.

The present disclosure relates more precisely to a carrying and dropping system for a military transport plane, wherein carrying the missile is performed in the plane cargo compartment and dropping is implemented through an opening arranged in the back the plane.

Numerous dropping systems are known, which generally use a parachute for dropping a piece of ammunition being carried on board. In such a case, the parachute being fastened to the piece of ammunition is in general inflated in the back of the plane so as to bring the piece of ammunition toward the back outside the plane.

In particular, the document DE-103 42 565 discloses a missile carrying and dropping system being provided on a transport plane. Such system comprises a container being arranged in the cargo compartment and being able to receive a plurality of missiles. Such missiles are mounted within the container so as be able to slide with respect to said container which is fastened inside the plane. Moreover, a parachute is fastened to the back of each of said missiles. In this case, to implement a missile dropping, the following steps are made:
the doors of the back cargo compartment of the plane are opened;
the parachute being fastened to the missile to be dropped is expanded outside the plane;
while inflating, such parachute retains the missile which is ejected backwards through sliding in said container; and
when the missile is completely ejected from the plane, it is released from the parachute, and it can be then propelled and guided as usual.

The dropping solutions with a parachute have numerous disadvantages, including:
a large slowing down of the piece of ammunition after dropping. In fact, the military transport planes are limited in velocity (generally around Vc=200/250 knots) upon a flight with the cargo compartment being open. The use of a parachute for extracting the piece of ammunition involves a quasi-nil velocity after dropping. Now, the present ammunition is dimensioned to be fired from fighters at high velocities (close to M=0.8-0.9 (Vc>400 knots)) without slowing down after dropping. The low velocity of the piece of ammunition after dropping suffers from problems of pilotability, engine start for cruising missiles, as well as a strong range reduction for guided bombs and small missiles. Consequently, the use of initially dimensioned ammunition for dropping from fighters makes the integration of a re-acceleration system necessary;
a risk of collision at the cargo compartment exit. In fact, the lower cargo compartment door is horizontal upon a flight dropping. The piece of ammunition should then run over a distance equivalent to the door length (5 to 6 meters) before exiting from the plane area. This last disadvantage reduces the fields of use (limitation of the acceptable meteorological conditions);
the integration on the piece of ammunition of a holding point allowing both the piece of ammunition to exit in a balanced way and the acceleration efforts to be supported. Moreover, it should be anticipated to provide a safety system allowing for the parachute dropping if the piece of ammunition stays jammed; and
a lack of discretion upon the parachute dropping, once the piece of ammunition is ejected. In fact, the parachute is not recovered after dropping, which can allow for enemy troops to identify the origin of a shoot.

Consequently, the use of a parachute upon a dropping is complicated to be implemented and needs heavy modifications for adapting it to usual (missiles and bombs) ammunition.

SUMMARY

The present method, system and device aim at obviating such disadvantages. It relates to a load carrying and dropping system for a transport plane, allowing, with no use of a parachute, for a secure dropping and with a reduced cost and being easily adaptable for any type of transport plane.

With this end in view, according to the present method, system and device, said carrying and dropping system of the type comprising at least one container being arranged in the cargo compartment of the plane and being able to receive at least one load being mounted within said container through sliding means, is remarkable in that said container is arranged within said cargo compartment so as to be able to be moved longitudinally and to be brought from one to the other of the following positions:
one carrying position, wherein it is completely located inside the cargo compartment; and
one dropping position, wherein it is offset longitudinally toward the back of the aircraft with respect to said carrying position, so that a part of said container, the dropping part is then located outside the transport plane through an opening at the back of the cargo compartment, and
in that said sliding means are formed so as to be able to bring said load in said dropping part, where it can be dropped when said container is in said dropping position.

So, thanks to the present method, system and device, a part of the container (dropping part), where a load can be brought, can be moved outside the transport plane. Such load can then be dropped with no use of extraction means and, in particular, with no use of a parachute, which allows particularly to remedy to the above mentioned important disadvantages relative to a dropping with a parachute.

In particular, thanks to the present method, system and device, the following advantages are specifically obtained:

- a lack of slowing down for the load after dropping, which allows, in the case of a missile, to stay in the pilotability field of the missile and the engine starting. In this situation, the integration of a missile re-acceleration system is no longer indispensable;
- no equipment is dropped, unlike dropping by parachute, which allows a certain operational discretion to be obtained; and
- as the dropping part of the container is located outside the transport plane, the risks of collision with the latter are strongly reduced, and a well more extended dropping field is obtained.

In the dropping position, the load is dropped preferably with a simple release. However, within the framework of the present method, system and device, dropping can also be performed (in such dropping position) either by ejection or by ejection and release.

Advantageously, said sliding means comprise rails fastened on the container and provided with an ejection device being able to slide on said rails and to support the load upon carrying and to release it (by simple release and/or ejection) upon dropping. Thus, an ejection device can be used, which is similar to a usual ejection device employed upon carrying and dropping for a piece of ammunition on a fighter. This enables to use the carrying points usually existing on ammunition and thus limits the modifications to be brought to the latter.

Moreover, advantageously, said container comprises a cage provided with compartments able to receive a plurality of loads, being identical or different, which enables to have an operational flexibility available. Such compartments can be arranged in rows and/or columns. Moreover, each compartment can contain longitudinally several missiles if the respective sizes allow it.

Since said container comprises a (single) cage provided with every means necessary for carrying and dropping, it is sufficient to arrange such a container in the plane so as to be able to implement the present method, system and device. Consequently, the present method, system and device do not need an important modification of the transport plane being used and it can be provided on any type of transport plane.

Furthermore, if container connecting means are provided on the fuselage of the transport plane, which can be easily dismantled, the plane can be brought back to its initial configuration quickly and at low cost so that it can fill other types of missions, such as troop and/or vehicle transportation.

Moreover, advantageously:

- the rails are fastened on the internal sides of the container so as not to disturb dropping of loads from a upper stage when the container comprises several superposed stages;
- the system according to the present disclosure comprises, for each load, dedicated sliding means. So, providing sliding means adapted for the type of load being used, it is possible to carry and drop different types of load with the help of only one container, enabling specifically to increase the operational capacities.

Furthermore, advantageously, said system also comprises a dropping control device being able to control the means for moving said container, as well as said sliding means, and which is arranged in a dedicated area of the transport plane which could be pressurized.

The present method, system and device also relate to a (military) transport plane comprising a carrying and dropping system such as the one above-mentioned.

BRIEF DESCRIPTION OF THE FIGURES

The FIGS. of the accompanying drawing will make well understood how the present method, system and device can be implemented. On such figures, like references indicate like components.

FIGS. 4A, 4B, 4C and 4D illustrate schematically successive times corresponding to the successive droppings of ammunition from a same container on board.

DETAILED DESCRIPTION

Figure 1:
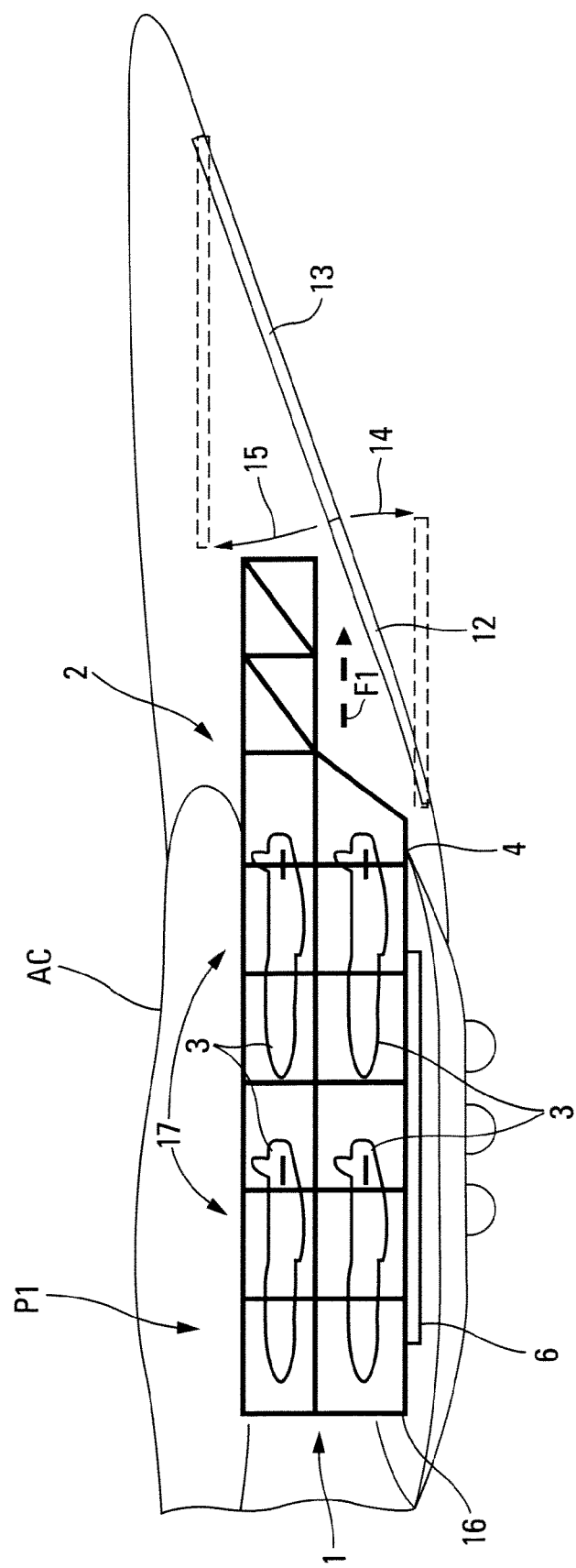
FIGS. 1 and 2 show schematically a system according to the present disclosure, which is arranged on a transport plane, respectively in a carrying position and in a dropping position.
Figure 2:
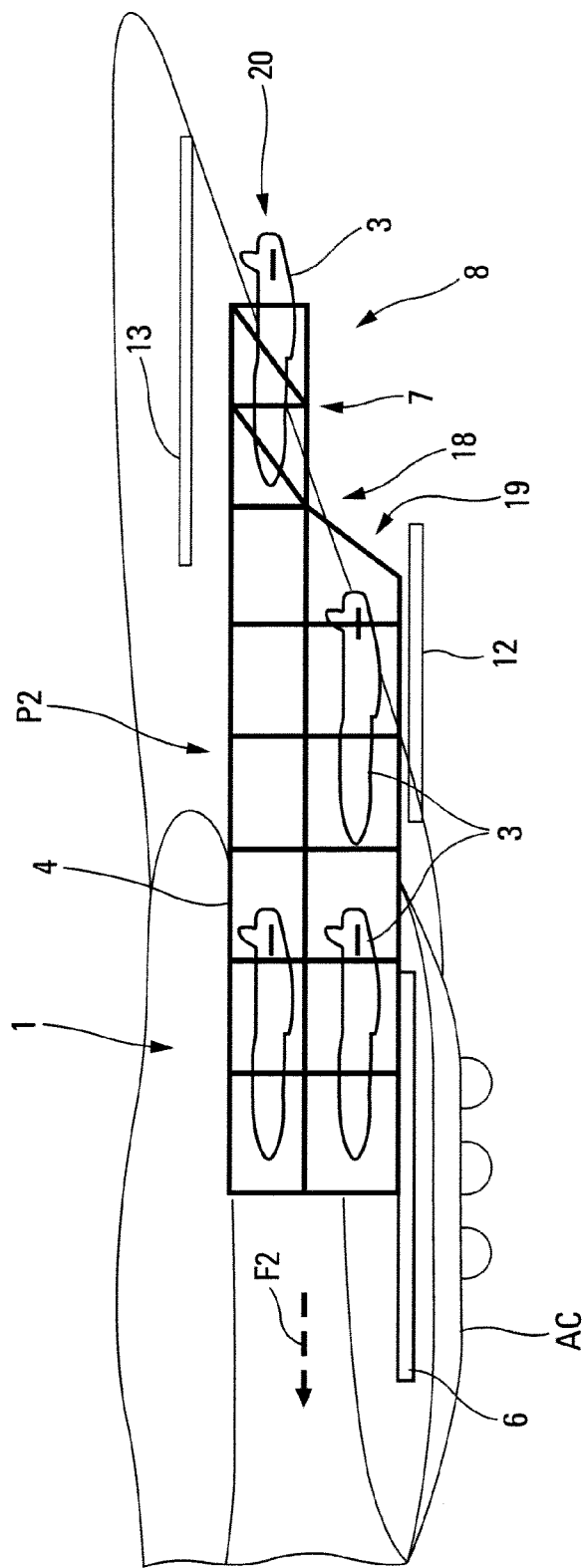

The system 1 according to the present disclosure and represented schematically on FIGS. 1 and 2 is provided to be arranged on a transport plane AC, specifically in a heavy military transport plane, and at least in part in the cargo compartment 2 of said transport plane AC, and it is provided to carry and drop loads representing as a preferred example, ammunition in the following description.

A piece of ammunition 3 corresponds to a projectile which is part of usual weapon system with a military load and which is equipped with usual propelling means and usual guiding means adapted to fly it and to guide it toward a target to be damaged or destroyed. This could be specifically a guided bomb or a cruising missile.

Said system 1 comprises a container 4 being arranged in the cargo compartment 2 of the transport plane AC and being able to receive at least one piece of ammunition 3. In the example of FIGS. 1 and 2, said container 4 comprises eight pieces of ammunition, namely two groups of four pieces of ammunition 3, arranged side by side, only one group of which is visible on such FIGS. 1 and 2. Each piece of ammunition 3 is arranged inside the container 4 so as to be able to slide longitudinally with the help of sliding means 5 (FIG. 3) to be precised thereinafter.

According to the present method, system and device, said container 4 is arranged in the cargo compartment 2 of the transport plane AC so as to be able to be moved longitudinally with the help of moving means 6 comprising for example rails fastened on the fuselage of the plane, cooperating with means being integral with the container 4.

According to the present method, system and device, said container 4 can be brought, with the help of said moving means 6, from a front position P1 represented on FIG. 1 to a rear position P2 represented on FIG. 2, in the direction illustrated by an arrow F1, and from such position P2 again to the position P1 in the direction illustrated by an arrow F2. These positions P1 and P2 correspond, respectively, to:

- a carrying position P1, wherein said container 4 is completely located inside the cargo compartment 2;
- a dropping position P2, wherein said container 4 is offset longitudinally toward the back of the aircraft AC with respect to said carrying position P1, so that a part 7 of said container 4, the dropping part is then located outside the transport plane AC through an opening 8 on the back of the cargo compartment 2.

Moreover, according to the present method, system and device, said sliding means 5 are formed so as to be able to bring the ammunition 3 being located in the container 4 within said dropping part 7. In a preferred embodiment, said sliding means 5 comprise rails fastened to the container 4 and provided with an ejection device 11 which is adapted to slide on said rails 10 and being able to support the ammunition 3 upon carrying and to release it upon dropping, as schematically shown on FIG. 3.

Furthermore, said system 1 comprises in addition a dropping control device 31 being adapted to control specifically said moving means 6 and said sliding means 5, further to the controls generated by an operator, and which is mounted in a dedicated area 32 of the transport plane AC, which can be pressurized.

Consequently, to perform dropping of ammunition 3 brought by the system 1 according to the present method, system and device, the following operations are implemented:

from the carrying position P1, i.e. the position being used upon flight phases (take-off, cruising phase, etc.) others than the dropping phase, for which the container 4 is located completely inside the cargo compartment 2 of the aircraft AC and the doors 12 and 13 on the rear are closed, an opening of said doors 12 and 13 is usually controlled (making them pivot as illustrated by arrows 14 and 15 on FIG. 1 so as to bring them in the positions represented in dotted line on such FIG. 1 and to form the opening 8 (FIG. 2)) and with the help of the dropping control device, the moving means 6 are controlled so as to generate a movement of the whole container 4 longitudinally backwards in the plane AC in the direction illustrated by the arrow F1;

when the container 4 is in the position P2, for which the dropping part 7 is located outside the plane AC, a piece of ammunition 3 is brought in such dropping part 7 with the help of said sliding means 5 (and of the dropping control device) and, in such position, the ejection device 11 is controlled so that it releases (by pure release and/or ejection) the piece of ammunition 3;

the preceding step can be carried out for a single piece of ammunition 3 or repeated for some or all the pieces of ammunition 3 contained in the container 4; and when the ammunition 3 that was to be dropped is dropped, the container 4 can be brought in the position P1 thereof in the direction illustrated by the arrow F2 and the doors 12 and 13 can be closed again.

So, thanks to the system 1 according to the present method, system and device, part of the container 4 (dropping part 7), wherein a piece of ammunition 3 can be brought, can be moved outside the transport plane AC. Such piece of ammunition 3 can then be dropped without having to use an extraction means, such as a parachute for example.

Consequently, thanks to the system 1 according to the present method, system and device, the following advantages are specifically obtained:

a lack of slowing down the piece of ammunition 3 after dropping, which allows in the case of a missile to stay in the pilotability field of the missile and starting of the engine thereof. In this situation, the integration of a missile re-acceleration system is not indispensable;

no piece of equipment is dropped, unlike dropping by parachute, which enables to obtain a certain operational discretion; and since upon the dropping, the dropping part 7 of the container 4 is located outside the transport plane AC, the risks of collision of the ammunition 3 with the latter are strongly reduced and a dropping field being more extended than the usual solutions is obtained.

Figure 3:
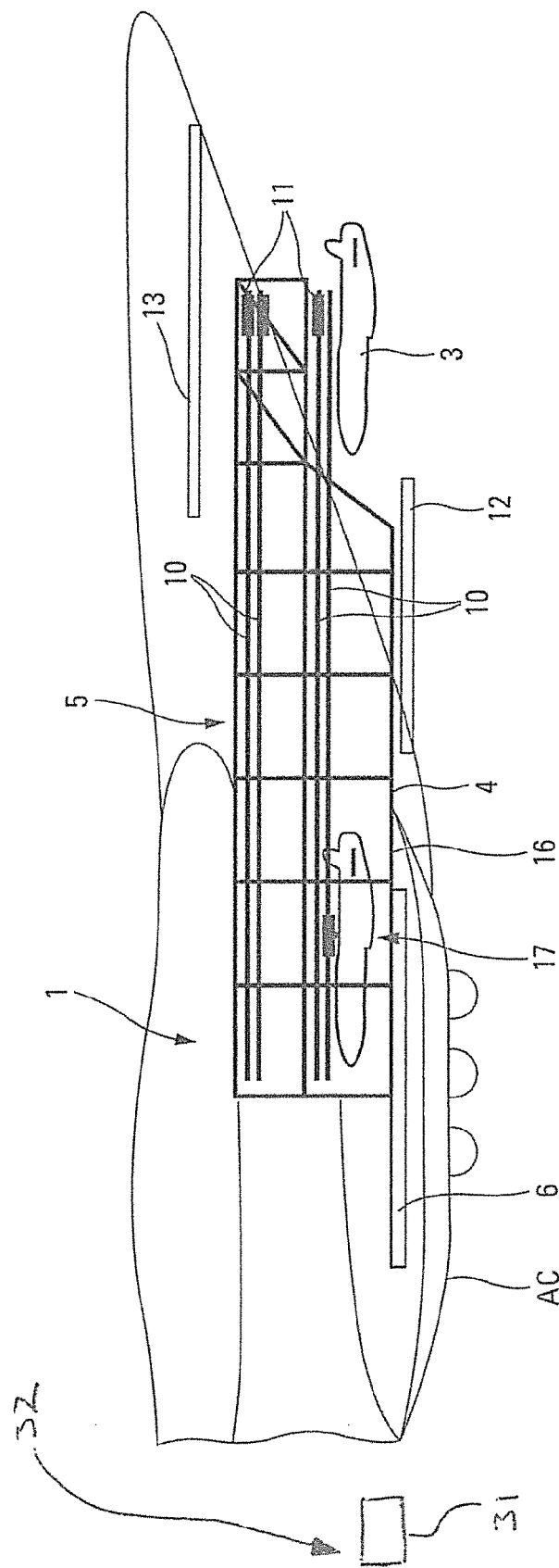
FIG. 3 illustrates schematically how to drop a piece of ammunition.

In a preferred embodiment, said container 4 comprises a cage 16 being equipped with compartments 17 adapted to receive each one or several pieces of ammunition 3. Such compartments 17 can be arranged in rows and/or columns. In the example of FIGS. 1 to 3, the container 4 comprises two compartment sets arranged in rows one above the other.

In this case, the rear end 18 of the container 4, which comprises the dropping part 7, should be formed so that the lower stage 19 does not disturb the dropping of a piece of ammunition 3 of the upper stage 20, as represented on FIG. 2. To do so, the rails 10 are fastened on the sides of the cage 16 of the container 4, such as illustrated on FIGS. 4A to 4D.

Said ejection device 11 remains on the rails 10 after dropping. Thus, the system 1 comprises a set of rails per piece of ammunition 3. Moreover, within the framework of the present method, system and device, an ejection device 11 can be used which is similar to a usual ejection device, used on a fighter. This enables specifically to use the carrying points usually existing on the ammunition and thus limits the modifications to be brought on the latter.

FIGS. 4A to 4D illustrate schematically, in a view of the back of the plane AC, the successive droppings of the four pieces of ammunition 3 being arranged in a container 4 similar to a part of the latter represented on FIGS. 1 and 2. FIG. 4C corresponds to the situation of the FIG. 3, for which the two pieces of ammunition 3 arranged at the upper stage 20 have been already dropped and the dropping of the first of the two pieces of ammunition 3 located at the lower stage 19 is performed.

The invention claimed is:

1. A load carrying and dropping system on an aircraft, said system comprising:

at least one container being arranged in a cargo compartment of the aircraft, the cargo compartment defined by a body and a plane defined by an aft edge of the body, the at least one container comprising an upper storage level and a lower storage level separated from one another, the at least one container sized and shaped to receive at least one load, the at least one load being mounted within said at least one container through sliding means for moving said at least one load;

wherein said at least one container is arranged within said cargo compartment and is movable longitudinally by moving means to be brought from one position to another position of the following positions:

a carrying position, wherein the at least one container is completely located inside the cargo compartment and supports said at least one load; and a dropping position, wherein the at least one container translates longitudinally toward the aft edge of the aircraft with respect to said carrying position so that at least parts of both the upper storage level and the lower storage level of said at least one container is located outside the cargo compartment; and wherein said sliding means is configured to move said at least one load in said at least one container within a dropping part to where the load can be dropped while in flight when said at least one container is in said dropping position.

2. The system according to claim 1, wherein said sliding means comprises rails fastened on the at least one container and provided with an ejection device slidable on said rails to support the at least one load upon carrying and to release the at least one load upon dropping.

3. The system according to claim 2, wherein said at least one container comprises a cage provided with compartments sized and shaped to receive a plurality of loads.

4. The system according to claim 2, wherein the rails are fastened on internal sides of the at least one container.

5. The system according to claim 3, further comprising, for each load, dedicated sliding means.

6. The system according to claim 2, further comprising a dropping control device to control said sliding means and the moving means, wherein said control device is arranged in a pressurized area of the aircraft.

7. The system of claim 1, wherein the upper storage level of the at least one container is offset further rearward than the lower storage level.

8. A load carrying and dropping system on an aircraft, said system comprising:
- a cargo compartment in the aircraft defined by a body of the aircraft and a plane defined by an aft edge of the body of the aircraft;
- at least one container being arranged in the cargo compartment of the aircraft and sized and shaped to receive a plurality of loads being mounted within said container through a sliding mechanism, the at least one container stores the plurality of loads on two different levels arranged one on top another;
- wherein said at least one container is arranged within said cargo compartment and is movable longitudinally with a moving mechanism to be brought from one position to another position of the following positions:
  - a carrying position, wherein the at least one container is completely located inside the cargo compartment and supports said plurality of loads; and
  - a dropping position, wherein the at least one container translates longitudinally toward the aft edge of the aircraft with respect to said carrying position so that a dropping part of said container is located outside the cargo compartment;
- wherein said sliding mechanism is configured to move said plurality of loads in said at least one container to said dropping part to where the plurality of loads can be dropped while in flight one at a time when said at least one container is in said dropping position, said sliding mechanism comprising rails fastened on the container and provided with an ejection device for each load being able to slide on said rails and to support the load upon carrying and to release the load upon dropping.

9. The system according to claim 8, wherein said at least one container comprises a cage provided with compartments each sized and shaped to receive at least one load.

10. The system according to claim 8, further comprising one set of rails per load.

11. The system according to claim 8, further comprising a dropping control device to control said sliding mechanism and the moving mechanism, wherein said control device is arranged in a pressurized area of the aircraft.

12. The system according to claim 11, wherein the dropping control device is programmed to drop a single load.

13. The system according to claim 11, wherein the dropping control device is programmed to drop a load or to drop a predetermined number of loads up to all loads carried by the aircraft.

14. A method of carrying at least one load in and dropping at least one load from an aircraft comprising:
- providing an aircraft comprising a cargo compartment defined by a body of the aircraft and a plane defined by an aft edge of the body of the aircraft;
- mounting at least one container in the cargo compartment, the at least one container comprising an upper storage level and a lower storage level, and having at least one load therein and comprising equipment to slide the at least one load to a dropping part on the upper storage level of the at least one container;
- opening a rear cargo opening while in flight;
- moving the at least one container from a carrying position completely inside the cargo compartment longitudinally rearward to a dropping position wherein a dropping part of the container is outside the cargo compartment;
- sliding the at least one load in said at least one container from an interior of the at least one container to the dropping part; and
- releasing the at least one load.

15. The method according to claim 14, further comprising providing a dropping control device to control the movement of the at least one container and the sliding of the at least one load, wherein said control device is arranged in a pressurized area of the aircraft.

16. The method according to claim 15, wherein the dropping control device is programmed to drop a single load.

17. The method according to claim 15, wherein the dropping control device is programmed to drop a load or to drop a predetermined number load up to all loads carried by the aircraft.

18. The method according to claim 14, wherein the container can store a plurality of loads on two different levels arranged one on top of another.

19. The method according to claim 14, wherein the at least one load is released at a speed close to a flight speed of the load.

* * * * *